(12) United States Patent
Kim et al.

(10) Patent No.: US 10,184,245 B2
(45) Date of Patent: Jan. 22, 2019

(54) EARTHQUAKE-RESISTANT LIGHT TOWER WITH THE TUNED MASS DAMPER

(71) Applicant: CHUNIL CO., LTD., Siheung-si, Gyeonggi-do (KR)

(72) Inventors: Myung Ho Kim, Seoul (KR); Si Yun Kim, Daegu (KR)

(73) Assignee: CHUNIL CO., LTD., Siheung-si, Gyeonggi-do (KR)

( * ) Notice: Subject to any disclaimer, the term of this patent is extended or adjusted under 35 U.S.C. 154(b) by 0 days.

(21) Appl. No.: 15/543,678

(22) PCT Filed: Apr. 11, 2017

(86) PCT No.: PCT/KR2017/003897
§ 371 (c)(1),
(2) Date: Jul. 14, 2017

(87) PCT Pub. No.: WO2017/217650
PCT Pub. Date: Dec. 21, 2017

(65) Prior Publication Data
US 2018/0209141 A1     Jul. 26, 2018

(30) Foreign Application Priority Data
Jun. 16, 2016   (KR) ................... 10-2016-0074873

(51) Int. Cl.
| E04B 1/98 | (2006.01) |
| E04H 9/02 | (2006.01) |
| F16F 7/10 | (2006.01) |
| F21S 8/08 | (2006.01) |
| E04H 12/08 | (2006.01) |
| F16F 15/02 | (2006.01) |

(Continued)

(52) U.S. Cl.
CPC ............. E04B 1/985 (2013.01); E04H 12/08 (2013.01); F16F 15/02 (2013.01); F21S 8/08 (2013.01); F21V 25/00 (2013.01); E04H 2009/026 (2013.01); F16F 7/1017 (2013.01); F16F 7/116 (2013.01)

(58) Field of Classification Search
CPC .... E04H 12/00; E04H 2009/026; F16F 15/02; F16F 7/1017; F16F 7/116; F21S 8/08; F21V 25/00; E04B 1/985
See application file for complete search history.

(56) References Cited

U.S. PATENT DOCUMENTS

| 3,246,431 A * | 4/1966 | Faerber | ................. E04B 1/346 |
| | | | 52/236.2 |
| 3,633,904 A * | 1/1972 | Kojima | ................. A63G 31/02 |
| | | | 472/2 |

(Continued)

FOREIGN PATENT DOCUMENTS

| JP | 2006-070945 A | 3/2006 |
| KR | 10-0799695 B1 | 2/2008 |

(Continued)

*Primary Examiner* — Rodney Mintz
(74) *Attorney, Agent, or Firm* — Rabin & Berdo, P.C.

(57) ABSTRACT

The present invention relates to an earthquake-resistant light tower with a tuned mass damper, in which a tuned mass damper is installed in a head part of a light apparatus installed on the top of a tower to absorb an earthquake or other vibration, thereby protecting a tower from vibration.

4 Claims, 5 Drawing Sheets

(51) Int. Cl.
*F16F 7/116* (2006.01)
*F21V 25/00* (2006.01)

(56) References Cited

U.S. PATENT DOCUMENTS

| | | | | |
|---|---|---|---|---|
| 3,784,179 A * | 1/1974 | Sugiura | ............... | B60G 15/061 |
| | | | | 188/268 |
| 3,908,940 A * | 9/1975 | Van Der Stricht | ..... | F16F 15/02 |
| | | | | 108/136 |
| 4,330,103 A * | 5/1982 | Thuries | ................... | H02B 1/54 |
| | | | | 248/548 |
| 4,402,483 A * | 9/1983 | Kurabayashi | ........... | E02D 27/34 |
| | | | | 248/559 |
| 5,042,162 A * | 8/1991 | Helms | .................. | F16F 7/1005 |
| | | | | 248/559 |
| 5,052,529 A * | 10/1991 | Sutcliffe | ................... | F16F 6/00 |
| | | | | 188/378 |
| 5,156,413 A * | 10/1992 | Juhasz | ................... | A63C 5/075 |
| | | | | 280/602 |
| 5,213,355 A * | 5/1993 | Juhasz | ................... | A63C 5/075 |
| | | | | 280/602 |
| 5,332,254 A * | 7/1994 | Juhasz | ................... | A63C 5/075 |
| | | | | 280/602 |
| 5,499,836 A * | 3/1996 | Juhasz | ................... | A63C 5/075 |
| | | | | 280/602 |
| 5,647,353 A * | 7/1997 | Juhasz | ................... | A63C 5/075 |
| | | | | 280/602 |
| 5,775,472 A * | 7/1998 | Osterberg | ................... | F16F 7/10 |
| | | | | 188/378 |
| 5,816,601 A * | 10/1998 | Juhasz | ................... | A63C 5/075 |
| | | | | 280/602 |
| 5,947,453 A * | 9/1999 | Eastman | ................. | F16F 1/185 |
| | | | | 244/17.11 |
| 5,954,169 A * | 9/1999 | Jensen | ................. | F16F 7/1005 |
| | | | | 188/378 |
| 6,533,256 B1 * | 3/2003 | Warren | ..................... | F16F 7/02 |
| | | | | 188/268 |
| 6,634,472 B1 * | 10/2003 | Davis | ........................ | F16F 7/10 |
| | | | | 188/378 |
| 6,681,908 B2 * | 1/2004 | Davis | ........................ | F16F 1/12 |
| | | | | 188/380 |
| 8,322,975 B2 * | 12/2012 | Kawabata | ............... | F03D 80/00 |
| | | | | 415/119 |
| 8,336,687 B2 * | 12/2012 | Kawabata | ............... | F16F 7/104 |
| | | | | 188/379 |
| 8,696,479 B2 * | 4/2014 | Marks | ..................... | E04B 1/985 |
| | | | | 182/141 |
| 8,857,585 B2 * | 10/2014 | Ryaboy | .................... | F16F 7/116 |
| | | | | 188/380 |
| 9,587,699 B1 * | 3/2017 | Griffin | ........................ | B64C 7/00 |
| 9,617,697 B2 * | 4/2017 | Stubler | .................... | E01D 11/04 |
| 9,618,076 B2 * | 4/2017 | Kropp | .................... | F16F 15/027 |
| 9,732,516 B2 * | 8/2017 | Zohar | ..................... | E04B 1/985 |
| 9,938,677 B2 * | 4/2018 | Wolters | ..................... | E01F 9/629 |
| 10,024,378 B2 * | 7/2018 | Konitz | ..................... | F16F 7/116 |
| 2002/0179806 A1 * | 12/2002 | Teng | ..................... | F16F 7/1005 |
| | | | | 248/618 |
| 2003/0127295 A1 * | 7/2003 | Davis | ........................ | F16F 1/12 |
| | | | | 188/316 |
| 2003/0188941 A1 * | 10/2003 | Davis | ........................ | F16F 7/10 |
| | | | | 188/379 |
| 2006/0179729 A1 * | 8/2006 | Li | ............................ | E04H 9/02 |
| | | | | 52/167.7 |
| 2008/0185224 A1 * | 8/2008 | Marks | ..................... | E04B 1/985 |
| | | | | 182/141 |
| 2012/0168271 A1 * | 7/2012 | Ryaboy | .................... | F16F 7/116 |
| | | | | 188/379 |
| 2012/0267207 A1 * | 10/2012 | Kawabata | ............... | F16F 7/104 |
| | | | | 188/379 |
| 2015/0028181 A1 | 1/2015 | Choi et al. | | |
| 2015/0322923 A1 * | 11/2015 | Konitz | ..................... | F16F 7/116 |
| | | | | 416/144 |
| 2015/0337518 A1 * | 11/2015 | Bezac | ..................... | E02D 27/34 |
| | | | | 52/741.15 |
| 2016/0069409 A1 * | 3/2016 | McGranahan | ........... | F16F 9/34 |
| | | | | 188/380 |
| 2016/0215754 A1 * | 7/2016 | Seidel | ........................ | B66C 1/10 |
| 2016/0222609 A1 * | 8/2016 | Wolters | .................. | E01F 9/629 |
| 2016/0273174 A1 * | 9/2016 | Stubler | .................... | E01D 11/04 |
| 2016/0289958 A1 * | 10/2016 | Zohar | ..................... | G01V 1/008 |
| 2017/0016510 A1 * | 1/2017 | Ryaboy | .................... | F16F 7/116 |
| 2017/0058984 A1 * | 3/2017 | Griffin | ........................ | B64C 7/00 |
| 2017/0248127 A1 * | 8/2017 | Drobietz | ................ | F03D 13/20 |

FOREIGN PATENT DOCUMENTS

| | | |
|---|---|---|
| KR | 10-1001687 B1 | 12/2010 |
| KR | 10-2011-0108913 A | 10/2011 |
| KR | 10-1164068 B1 | 7/2012 |
| KR | 10-2012-0107753 A | 10/2012 |
| KR | 10-1316696 B1 | 10/2013 |
| KR | 10-1381278 B1 | 4/2014 |

* cited by examiner

EARTHQUAKE-RESISTANT LIGHT TOWER WITH THE TUNED MASS DAMPER

TECHNICAL FIELD

The present invention relates to a light tower, and more particularly, to an earthquake-resistant light tower with a tuned mass damper, in which a tuned mass damper is installed in a light apparatus frame or a tower head to allow the light apparatus frame or the tower head to serve a tuning mass to absorb an earthquake or other vibration, thereby protecting a tower from vibration.

BACKGROUND ART

In general, a light tower, as a large-scale light facility installed for a night game or a performance, having a large area such as a playground, a harbor, and a performance hall, is installed in a tower (top) for illuminating the inside of the playground or performance hall from a high position and the light tower itself constitute one single facility.

In general, a light tower, as a large-scale light facility installed for a night game or a performance, having a large area such as a playground, a harbor, and a performance hall, is installed in a tower (top) for illuminating the inside of the playground or performance hall from a high position and the light tower itself constitute one single facility.

However, there are various technologies related with the tower light apparatus in the related art and examples thereof are Patents Documents 1 to 3.

In Patent Document 1, a rail-type elevating light tower having an elevating carrier joined to elevatably move along a guide rail formed on a prop and elevatably controlled by a wire towing the elevating carrier and driving means and braking means and including multiple light lamps and inner and outer ring-type supports and a support connection frame, is configured to include: a ring gear positioned on the top of the inner ring-type support of the elevating carrier and rotatably installed and having a gear unit in each of an upper part and an inner part; an electric motor to which a driving gear engaged with the inner gear part of the ring gear is axially joined and supported at one side of the inner ring-type support of the elevating carrier; a screw rod of which one end is engaged with an upper gear unit of the ring gear and the other end is rotatably supported by a bearing, and having a screw unit between one end and the other end; a conveyor ball-bearing-joined to the screw rod and advancing and retreating according to a rotational state of the screw rod; a slider in which one side is fixedly installed on the top of the conveyor and an installation part of a light lamp is fixedly installed at the other front end, and which interlocks with the conveyor; and a guide rail guiding linear movement of the slider and fixedly installed at a lower end of the support connection frame.

Patent Document 2 is configured to include a prop vertically erected with a predetermined height, a fixation frame installed on the top of the prop, an elevating frame elevatably installed along the prop and mounted with a light lamp, an elevation driving means elevation-driving the elevating frame, an XY-axis direction constraining means constraining the elevating frame not to move horizontally with respect to the fixation frame when the elevating frame rises, a Z-axis direction constraining means constraining the elevating frame not to move vertically horizontally with respect to the fixation frame when the elevating frame rises, and a remote adjustment switch remotely adjusting the light lamp, the elevation driving means, and the Z-axis direction constraining means.

In Patent Document 3, in a stationary lighting tower in which a ballast as a primary component constituting a light lamp device is installed in a support structure installed on the top of a tower in which a lamp is installed and an igniter is provided integrally with the lamp to make the lamp, the ballast, and the igniter be adjacent to each other to prevent voltage drop, thereby reducing power and extending constant lamp luminous flux and lamp life-span, and which includes an electrical equipment state detecting means detecting states of the ballast, the igniter, and a transformer, a database storing a reference value so as to determine whether the states of the lamp, the ballast, and the igniter are abnormal by comparing the lamp state, the ballast state, and the igniter states, a microcontroller including a display displaying states of each component sensed by the electrical equipment state detecting means, and a power line communication module for communication between the electrical equipment state detecting means and the microcontroller, the electrical equipment state detecting means is installed on the top of the tower and the microcontroller is installed inside a lower end of the tower, and as a result, an operator may determine whether the lamp and the ballast installed on the top of a light top on the ground through the display of the microcontroller before ascending the light tower and thereafter, perform a repairing work, thereby enabling rapid and safe maintenance.

When the light towers in the related art as a large-sized structure having a height of several tens of meters are shaken by external vibration such as an earthquake, electric and electronic elements constituting a light device may cause errors and when the earthquake occurs, the light towers are inclined or broken.

PRIOR ART DOCUMENT

Patent Document (Patent Document 1) Korean Patent Registration No. 10-0799695

(Patent Document 2) Korean Patent Registration No. 10-1001687

(Patent Document 3) Korean Patent Registration No. 10-1381278

DISCLOSURE

Technical Problem

The present invention is developed to solve the problem in the related art and an object of the present invention is to provide an earthquake-resistant light tower with a tuned mass damper, which includes an earthquake-resistant apparatus provided therein to protect from an earthquake.

In more detail, an object of the present invention is to provide an earthquake-resistant light tower with a tuned mass damper, in which a tuned mass damper is installed in a head part of a light apparatus installed on the top of a tower to absorb an earthquake or other vibration, thereby protecting a tower from vibration.

Technical Solution

In order to achieve such an object and an earthquake-resistant light tower with a tuned mass damper including an earthquake-resistant means installed in a light tower including a light device frame in which a light device is installed and/or a tower head on the top of a tower body and the earthquake-resistant means includes: a guide fixedly installed in the tower body, a slider fixedly installed below the light device frame or tower head so as to allow the light device frame or tower head to serve as the tuned mass body and including the light device frame or tower head to serve as the tuned mass body and supported by the guide to be horizontally movable, and an oil damper and a spring radially installed between the guide and the slider and absorbing vibration of the slider by vibration of the tower body.

Preferably, the friction reducing means is further installed between an upper surface of the guide and the bottom of the slider so that the slider smoothly moves.

Further, a mass of the slider is controlled so that a total mass acquiring by adding the mass of the light device frame, and the mass of the tower head and the mass of the slider is 1% or more or 20% or less of the total mass of the light tower including the tower body, the light device frame, the tower head, and the slider.

Advantageous Effects

As described above, an earthquake-resistant light tower with a tuned mass damper according to the present invention includes an earthquake-resistant means protect a light apparatus from external vibration.

Moreover, according to the present invention, the earthquake-resistant means constituted by the tuned mass damper is provided and a head of a light device is used as a mass body to perform an earthquake-resistant function without adding the mass body, thereby simplifying a structure and reducing a load burden of a tower body.

MODE FOR INVENTION

Figure 1:
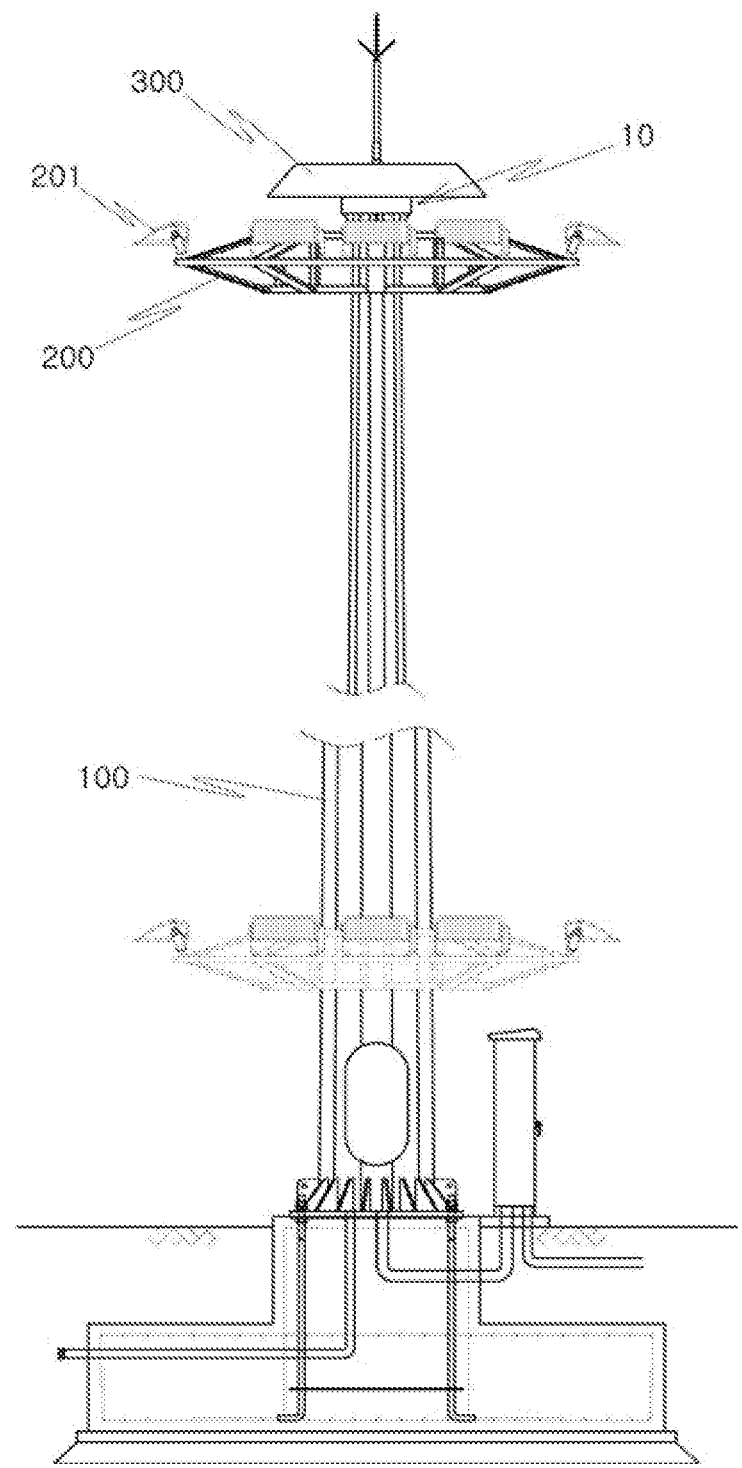
FIG. 1 is a side view of one example of an earthquake-resistant light tower with a tuned mass damper according to the present invention.

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

In describing each drawing, reference numerals refer to like elements. In describing the present invention, a detailed description of related known technologies will be omitted if it is determined that they make the gist of the present invention unclear.

Hereinafter, a preferred embodiment of the present invention will be described in detail with reference to the accompanying drawings.

In the present invention, a light device frame or a tower head serves as a tuned mass body to effectively absorb vibration of a tower body.

In an earthquake-resistant light tower with a tuned mass damper according to the present invention, an earthquake-resistant means 10 is installed in a light tower including a light device frame 200 in which a light device 201 is installed and/or a tower head 300 on the top of a tower body 100.

That is, according to the present invention, a tuned mass damper technologies is applied to the light tower and a separate tuned mass body is not installed in the tower body 100 and the light device frame 200 or the tower head may be used as the tuned mass body.

The earthquake-resistant means 10 includes: a guide 11 fixedly installed in the tower body 100; a slider 12 fixedly installed below the light device frame or tower head 300 so as to allow the light device frame or tower head 300 to serve as the tuned mass body and including the light device frame or tower head 300 to serve as the tuned mass body and supported by the guide to be horizontally movable; and multiple tuned damper 13 radially installed between the guide and the slider and absorbing vibration of the slider by vibration of the tower body.

A normal light tower includes a fixation type light tower in which the light device is fixedly installed and an elevation type light tower capable of elevating the light device, and in the case of the fixation type light tower, the light device frame 200 in which the light device 201 is installed on a platform of the tower body is integrally fixedly installed and in the case of the elevation type light tower, the light device frame 200 is elevatably installed and the tower head 300 is provided on the top of the tower body in order to elevate the light device frame.

As a result, in the case of the fixation type light tower, the earthquake-resistance means 10 is installed in the light device frame 200 and in the case of the elevation type light tower, the light device frame is elevated, and as a result, the earthquake-resistance means 10 is installed in the tower head 300.

Therefore, the light device frame 200 or the tower head 300 serves as the tuned mass body.

In FIGS. 1 to 5, one example of the elevation type light tower is illustrated and hereinafter, the earthquake-resistant tower with the tuned mass damper according to the present invention will be described based on the elevation type light tower.

The guide 11 is fixedly installed in the tower body 100 below the light device frame 200 or the tower head 300 as illustrated in FIGS. 2 to 5.

Figure 5:
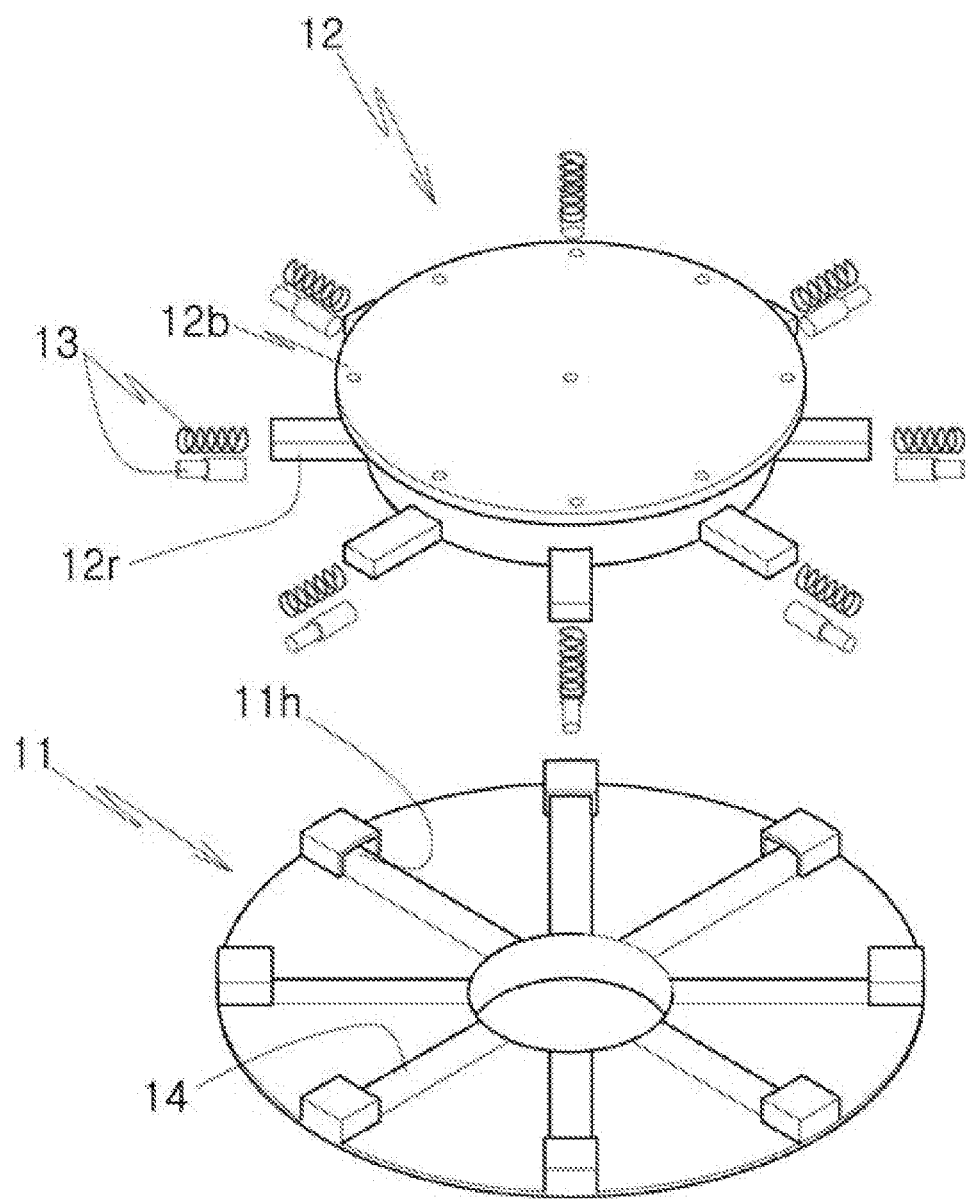
FIG. 5 is a perspective view of the earthquake-resistant means installed in the light tower according to the present invention.

In the guide 11 as a means that supports the slider 12 to horizontally move, a support projection 11d is formed on an upper surface so as to restrict a movement range of the slider 12 or a sliding hole 11h is formed so as to move while a sliding rod 12r formed in the slider 12 engages in the sliding hole 11h as illustrated in FIG. 5.

Figure 2:
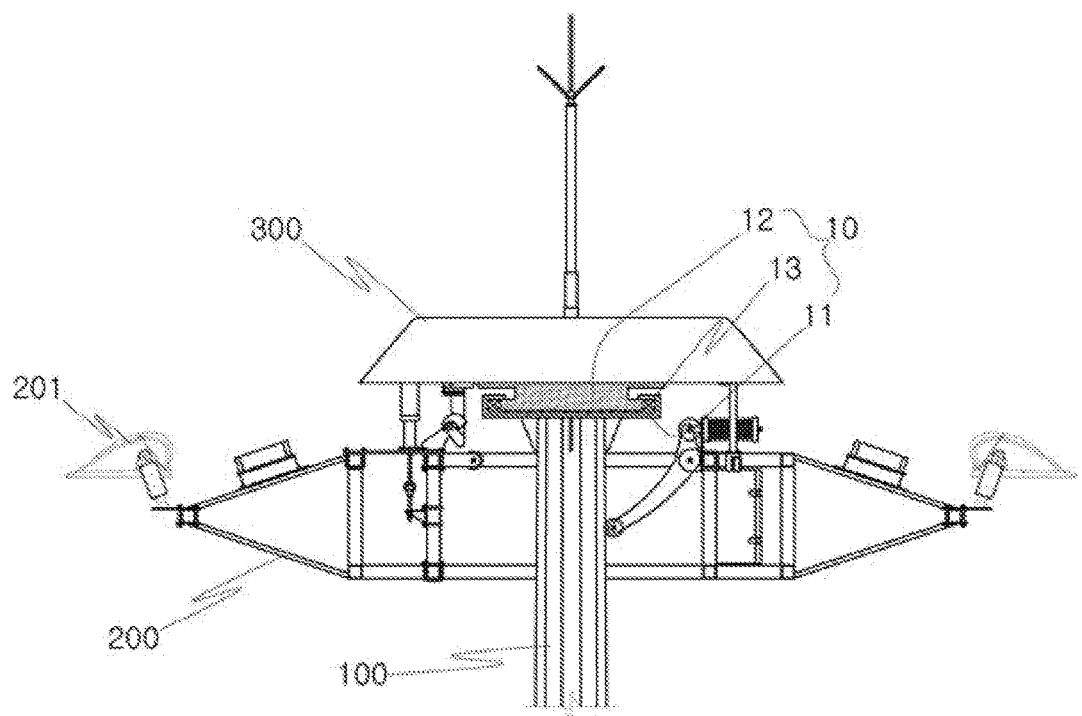
FIG. 2 is a side view of a light device head part having an earthquake-resistant means in the light tower according to the present invention.
Figure 3:
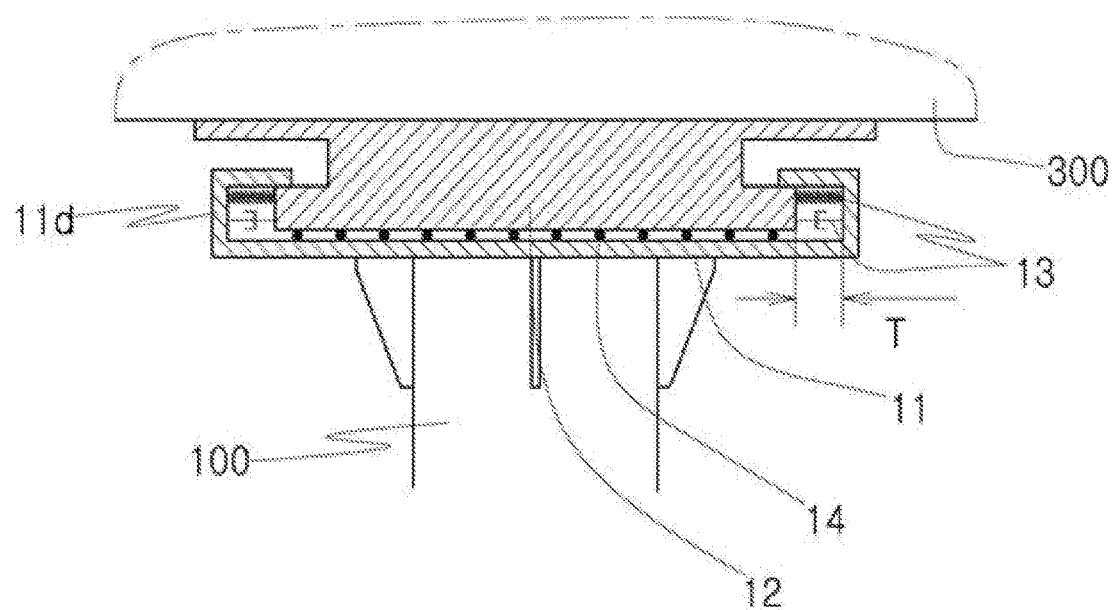
FIG. 3 is a side view of one example of the earthquake-resistant means in the light tower according to the present invention.
Figure 4:
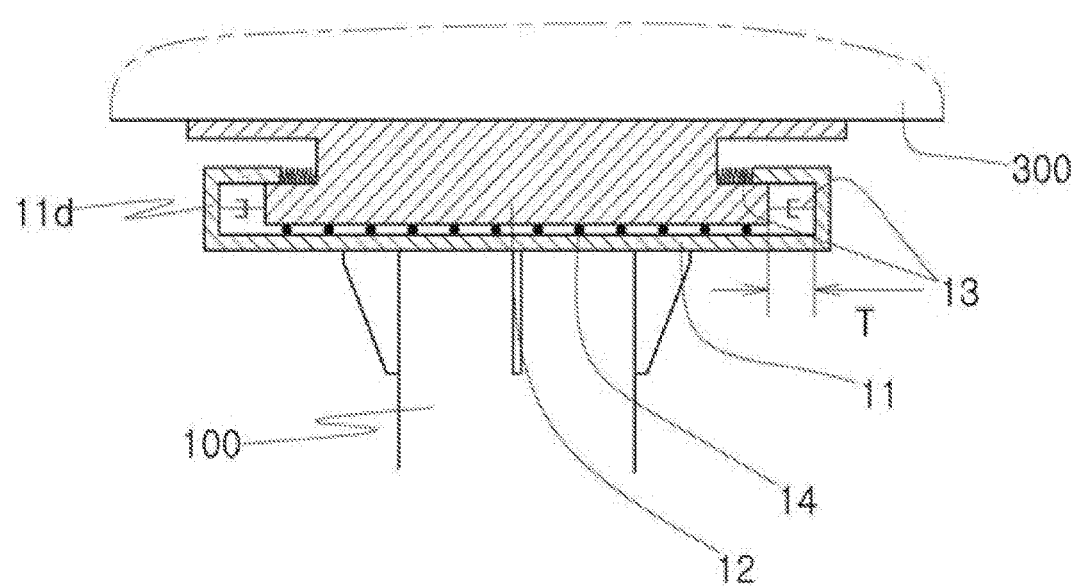
FIG. 4 is a side view of another example of the earthquake-resistant means in the light tower according to the present invention.

Of course, as illustrated in FIGS. 2 to 4, the guide 11 may be formed in a circular plate shape and the sliding groove may be formed by bending an edge of a circular plate.

The slider 12 is fixedly installed on the bottom of the light device frame 200 or the tower head 300 and installed to be horizontally moved by the guide 11.

That is, when the tower body 100 vibrates, the guide 11 horizontally moves, but the slider 12 may not move and as a means that buffers the vibration of the guide so as to prevent the vibration of the guide from being transferred to the slider, the tuned damper 13 is provided.

The tuned damper 13 as a means for absorbing the vibration of the guide 11 so as to prevent the guide 11 which vibrates by the vibration of the tower body 100 from being just transferred to the slider 12 may adopt any one or both of a guide spring and an oil damper.

The tuned damper 13 may be installed between the support projection 11d formed on the edge of the guide 11 and an outer peripheral end of the slider 12 as illustrated in FIG. 2 or installed between a part on the top of the guide, which is bent inward and an outer wall of a body of the slider 12 as illustrated in FIG. 4.

Further, a friction reducing means 14 may be further installed between the upper surface of the guide 11 and the bottom of the slider 12 so that the slider smoothly moves.

The friction reducing means 14 may be achieved by installing a bearing between the guide 11 and the slider 12 or manufacturing the guide 11 and the slider 12 with bearing metal.

Further, the slider 12 preferably controls a mass so as to serve as the tuned mass damper.

That is, in the normally used tuned mass damper, the mass of the tuned mass body varies in proportion to the mass of the entirety of a structure which requires earthquake resistance.

As a result, only when a mass acquiring by adding the mass of the light device frame 200 or the tower head 300 and the mass of the slider 12 needs to be controlled in proportions to the mass of the entirety of the light tower including the tower body, the light device frame, the tower head, and the slider, optimal earthquake-resistant performance may be exhibited.

As a result, the mass of the slider 12 is preferably controlled so that the mass acquired by adding the mass of the light device frame 200 or the tower head 300 and the mass of the slider 12 is 1% or more or 20% or less of the total mass of the light tower including the tower body, the light device frame, the tower head, and the slider.

A result of structurally analyzing the earthquake-resistant light tower with the tuned mass damper according to the present invention, which is configured as above is shown in a comparison table given below.

As the result of analyzing a structure in which the earthquake-resistant means is not installed and the earthquake-resistant light tower with the tuned mass damper according to the present invention by using 12 earthquake waves, it can be seen that a maximum displacement of an uppermost part is reduced by an average of 75.1% and maximum bottom shear force is reduced by an average of 31.2% and it can be seen that in the case of the earthquake-resistant light tower with the tuned mass damper according to the present invention, the mass of the light device is relatively large, and as a result, a significant effect is achieved.

Further, it is preferable to control a width of a displacement T of the slider according to the mass of the mass body, which is acquired by adding the mass of the light device frame 200 or the tower head 300 and the mass of the slider 12.

That is, as illustrated in FIGS. 3 and 4, it is very important to select and apply an optimal mass displacement limit as the displacement T which is a distance between an edge end of the slider 12 and an end support projection of the guide 11.

That is, when the displacement is excessively narrow, a movement width of the slider is small, and s a result, elastic force of the tuned damper 13 is still applied to the slider to serve to accelerate the vibration of the slider, and as a result, more effective earthquake resistance may be preferably achieved by controlling the displacement T and this may vary depending on a scale of the light tower.

SEQUENCE LIST TEXT

10: Earthquake-resistance means
11: Guide
11d: Support projection
11h: Sliding hole
12: Slider
12b: Slider body
12r: Sliding rod
13: Tuned damper
14: Friction reducing means
100: Tower body
200: Light device frame
201: Light device
300: Tower head

| Earthquake | Input Earthquake Wave | Maximum displacement of uppermost part (mm) | | | Maximum bottom shear force (kN) | | |
|---|---|---|---|---|---|---|---|
| | | Normal Tower | Tower with TMD | TMD effect (%) | Normal Tower | Tower with TMD | TMD effect (%) |
| Kobe | KB-KBU-E | 338.7 | 50.3 | −85.16 | 14.9 | 8.7 | −41.66 |
| | KB-KBU-N | 180.3 | 49.0 | −72.85 | 8.1 | 6.4 | −21.26 |
| | KB-PRI-E | 469.6 | 71.4 | −84.81 | 18.6 | 10.0 | −46.22 |
| | KB-PRI-N | 437.0 | 62.0 | −85.81 | 16.1 | 9.1 | −43.41 |
| Loma Prieta | LP-CAP-E | 242.8 | 64.2 | −73.54 | 15.8 | 9.8 | −38.13 |
| | LP-CAP-N | 138.3 | 60.6 | −56.17 | 10.5 | 10.6 | 1.30 |
| | LP-CLS-E | 221.3 | 105.2 | −52.45 | 14.6 | 12.2 | −16.59 |
| | LP-CLS-N | 194.4 | 54.7 | −71.85 | 11.4 | 11.4 | 0.19 |
| Northridge | NO-ARL-E | 235.6 | 47.9 | −79.68 | 13.8 | 7.8 | −43.45 |
| | NO-ARL-N | 142.9 | 44.3 | −69.02 | 11.5 | 6.9 | −39.46 |
| | NO-SCS-E | 791.8 | 89.2 | −88.73 | 30.0 | 12.9 | −57.05 |
| | NO-SCS-N | 876.5 | 165.4 | −81.13 | 29.2 | 21.0 | −28.13 |
| | | | Average | −75.10 | | Average | −31.16 |

What is claimed is:

1. An earthquake-resistant light tower with a tuned mass damper, comprising:
   a light tower body;
   a light device frame and a tower head disposed at a top portion of the light tower body;
   a light device installed on the light device frame; and
   an earthquake-resistant means installed on a top end of the light tower body and configured to absorb vibration of the light tower body,
   wherein the earthquake-resistant means includes:
      a guide having a circular plate shape and fixedly installed on the top end of the light tower body, the guide including
         a plurality of support projections formed on the guide along a circumference of the guide and having a box shape with an opening at one side thereof, wherein each of the support projections is separated from adjacent support projections at regular intervals;
      a slider fixedly installed on a bottom side of the tower head, the slider including
         a slider body having a circular plate shape and a predetermined thickness, wherein a diameter of the slider body is less than that of the guide, and
         a plurality of sliding rods radially installed on a side wall of the sliding body at regular interval, wherein each of the sliding rods is separated from adjacent sliding rods and an end of said each of the sliding rods is inserted into the opening of said each of the support projections, respectively;
      a plurality of dampers disposed inside the support projections such that each of the dampers is disposed between an inner wall of said each of the support projections and the end of said each of the sliding rods, respectively; and
      a friction reducing means installed between the guide and the slider so that the slider smoothly moves on the guide, and
   wherein a total mass adding a mass of the light device frame, a mass of the tower head and a mass of the slider is between 1% and 20% of a total mass of the light tower including the light tower body, the light device frame, the tower head, and the slider.

2. The earthquake-resistant light tower with a tuned mass damper of claim 1, wherein said each of the dampers is any one or both of a spring and an oil damper.

3. An earthquake-resistant light tower with a tuned mass damper, comprising:
   a light tower body;
   a light device frame and a tower head disposed at a top portion of the light tower body;
   a light device installed on the light device frame; and
   an earthquake-resistant means installed on a top end of the light tower body and configured to absorb vibration of the light tower body,
   wherein the earthquake-resistant means includes:
      a guide having a circular plate shape and fixedly installed on the top end of the light tower body, the guide including
         a plurality of support projections formed on the guide along a circumference of the guide and having a box shape with an opening at one side thereof, wherein each of the support projections is separated from adjacent support projections at regular intervals;
      a slider fixedly installed on a bottom side of the tower head, the slider including
         a slider body having a circular plate shape and a predetermined thickness, wherein a diameter of the slider body is less than that of the guide, and
         a plurality of sliding rods radially installed on a side wall of the sliding body at regular interval, wherein each of the sliding rods is separated from adjacent sliding rods, and an end of said each of the sliding rods is inserted into the opening of said each of the support projections, respectively;
      a plurality of dampers disposed between an edge of a top wall of said respective support projections and the side wall of the sliding body; and
      a friction reducing means installed between the guide and the slider so that the slider smoothly moves on the guide, and
   wherein a total mass adding a mass of the light device frame, a mass of the tower head and a mass of the slider is between 1% and 20% of a total mass of the light tower including the light tower body, the light device frame, the tower head and the slider.

4. The earthquake-resistant light tower with a tuned mass damper of claim 3, wherein said each of the dampers is any one or both of a spring and an oil damper.

* * * * *